United States Patent Office 2,703,246
Patented Mar. 1, 1955

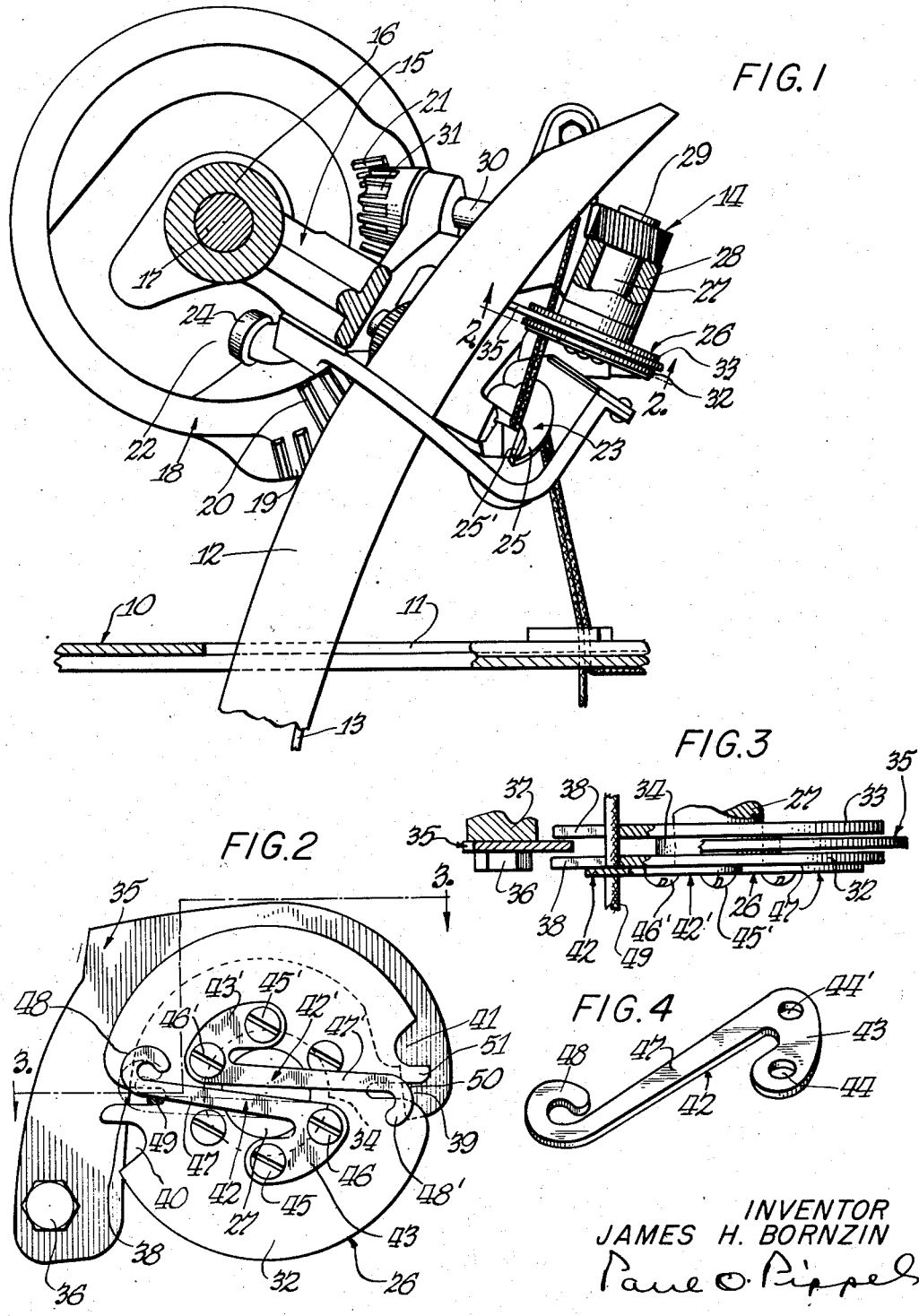

2,703,246

TWINE TENSION SPRING FOR KNOTTER DISKS

James H. Bornzin, Memphis, Tenn., assignor to International Harvester Company, a corporation of New Jersey Application June 12, 1953, Serial No. 361,135

2 Claims. (Cl. 289—15)

This invention relates to new and improved twine tension springs for knotter disks.

The present invention is concerned with knotting mechanisms which are used on baling machines. These knotting mechanisms are required to make a knot in a strand of twine encircling a bundle or a bale. More particularly the baling machines on which knotting mechanisms are employed require the tying of a bale or bundle which is relatively compact and with a minimum of slack in the encircling twine. There are many factors involved in the efficient tying of a twine knot. One of these factors which has been previously little thought of is the quality of the twine which is used in the knotting mechanism. Twine may be made from many materials and oftentimes the combinations of materials result in various surface coefficients of friction and also various body deformations. A still further simple difference in twines is the diameter of the twine. These variable physical characteristics of the twine make it extremely difficult for a single knotting mechanism to operate effectively under all circumstances. Primarily, agricultural baling and binding machines employ a twine which has a sisal as its major constituent. Thus, twine made of sisal fibers and having only a minor portion of various other fibers has been relatively uniform in its physical characteristics and the various knotting mechanisms designed and built for hay bundling and baling machines were able to cope with the minute physical differences of the twine which were occasioned by only slight variations in the component elements and the percentage of each comprising the completed twine. In the past several years there have been numerous synthetic fibers developed and these fibers are now being produced in greater quantity so that there is a tendency on the part of certain manufacturers to utilize these new fibers in twines. Many of these synthetic fibers have tensile strengths far in excess of the natural sisal fibers and, as a result, a twine made from these new fibers may be considerably smaller in diameter and bulk than the twine made from sisal and yet the tensile strengths of both may be the same. Obviously, then, the manufacturer does not want to increase his costs merely to increase the bulk of the twine in order that the twine may be usable within the presently designed and used knotting mechanisms.

A principal object of the present invention is to provide means in association with twine tying mechanisms for accommodating twines having various diameters and physical characteristics.

An important object of this invention is to supply spring yielding members in association with twine knotting mechanisms for yieldably varying the size of the notch opening to thus permit the use of twine having different diameters.

Another and further important object of this invention is to provide means in conjunction with a twine tying device for permitting uniform rendering of twine through the holding mechanism regardless of the bulk of the twine being used.

Another and still further important object resides in the provision of means for rendering twine in a knotting mechanism and eliminating, to a considerable extent, the rendering differences in twines due to variations in coefficients of friction of the surfaces of the twines.

Still another important object of this invention is to supply twine holding disks for knotting mechanisms with spring arm members arranged in a manner over and alongside radially disposed notches in the disks to accomplish variable widths for the notches yieldable to receive twines of practically any size.

Other and further important objects of this invention will become apparent from the disclosures in the following specification and accompanying drawing.

In the drawing:

Fig. 1 is a side elevational view, partially in section, of a portion of the knotting mechanism employing the present twine rendering invention;

Fig. 2 is an enlarged sectional view taken on the line 2—2 of Fig. 1;

Fig. 3 is an enlarged sectional view taken on the line 3—3 of Fig. 2; and

Fig. 4 is a further enlarged perspective view of one of the yieldable springs employed on the twine holding disks of this invention.

As shown in the drawing, the reference numeral 10 indicates generally a baling chamber having an elongated slot 11 in the upper surface thereof for the purpose of permitting the passage of a twine-carrying needle 12. The needle 12 is arranged and constructed to carry a strand of twine 13 around a bale or bundle of hay or the like whereupon it delivers the twine 13 to the knotting mechanism identified generally by the numeral 14.

The knotting mechanism includes a supporting frame structure 15 having at one portion thereof a sleeve-type bearing 16 for the purpose of receiving a shaft 17. The shaft 17 is rotatable within the bearing 16. An enlarged bevel bear 18 is mounted on and driven by the shaft 17 and through the medium of a plurality of gear teeth segments thereon shown at 19, 20, and 21, the various elements of the knotter to be driven receive their rotary motion. Similarly, the member 18 comprises a cam track 22 in order to cause an opening and/or closing of the twine holding bill hook designated by the numeral 23. A cam operating roller 24 is arranged to ride within the track 22 which influences the angular position of the cam roller to thus open or close the twine gripping jaws 25 and 25' of the bill hook 23. A twine holding device 26 is mounted on a shaft 27 journally mounted in a bearing portion 28 of the frame structure 15. Rotatable drive is delivered to the shaft 27 through the medium of a gear 29 on the end thereof cooperating with a worm member, not shown, on a shaft 30 which receives intermittent rotative drive from a bevel gear 31 engaging the bevel gear tooth segment 21 of the enlarged rotatable member 18.

As best shown in Figs. 1 and 3, the twine holding mechanism 26 includes spaced apart disk or plate members 32 and 33 which lie parallel to each other. The plates 32 and 33 maintain their separation by means of a spacer member 34, all of which are mounted on the shaft 27.

A keeper member 35 constitutes substantially a semicircle and is adapted to extend around and project slightly within the groove formed between the spaced apart plates 32 and 33. The keeper 35 is anchored by bolt means 36 to a post member 37 forming a part of the frame supporting structure 15. The keeper 35 thus acts to maintain the twine within notches in the circumference of the plate members 32 and 33 during rotation of these members. The spaced plates 32 and 33 have matched notches opened to the outer circumference and extending radially inwardly, as shown at 38 and 39, and 40 and 41. The notches 38 and 39 are diametrically opposed and, similarly, the relatively enlarged wide mouthed notches 40 and 41 are diametrically opposed. Further, the wide mouthed notch 40 lies closely adjacent the notch 38 and, similarly, the wide mouthed notch 41 lies closely adjacent the notch 39.

In order to effect a tying of the ends of twine, the needle 12 is adapted to carry the twine 13 around the bale or bundle to be tied and deliver that twine up into either of the notches 38 or 39 and at the same time pass the twine over in close proximity to the bill hook 23. The bill hook, as previously explained, grasps the twine and makes the knot therein with the initially held end of twine while the twine is rendered through the holder mechanism 26. The rendering of twine is necessary in order to supply sufficient twine to complete the knot and yet there must be a tendency to hold the twine back away from the bill hook in order to effect a relatively tight knot which is desirable in baling or bundling operations. The purpose of the twine holder is twofold, one, in that it holds the twine in such a manner that the twine may be pulled therethrough to supply sufficient twine for the making of the knot and, second, to supply a means of holding the severed end of twine for the purpose of making a succeeding bale or bundle.

In order to cause the twine holder 26 to be more effective on twines of variable diameters and/or various surface coefficients of friction, spring means 42, as shown in Fig. 4, are applied to the underside of the disk 32 in such a manner that the slots 38 and 39 have spring yielding widths. As best shown in Fig. 2, two such springs 42 are applied to the holding mechanism 26. It should be understood that theses spring means are identical but in order to distinguish the two springs, as shown in Fig. 2, one of them will be designated with "prime" numbers. The spring means 42 is provided with a base or anchoring portion 43 having spaced apertures 44 and 44' therethrough. These holes are for the purpose of receiving screws 45 and 46 which engage the plate 32. The remainder of the spring means 42 includes a relatively long, flat spring portion 47 and an outwardly turned end 48. The turned end 48 lies closely adjacent the outer periphery of the plate 32 and adjacent the slot 38. The end of the shank or flat portion 47 lies across the slot 38, thus providing a biasing of the slot and a spring compressing of a twine 49 being passed therethrough. The twine 49 is thus pulled from the slot 38 against the action of the spring biasing effect of the spring means 42. Similarly, the spring means 42' is held at its base portion 43' by screw means 45' and 46'. The elongated flat portion 47' of the spring means 42 extends outwardly over the radial notch 39 in the disk 32. There is no twine shown within this notch 39 but upon entering the notch a strand of twine would press against a V-shaped mouth 50 formed by the turned end portion 48' of the spring means and a projection 51 of the plate 32 disposed between the adjacent notches 39 and 41. The spring 42' thus yields arcuately and possibly somewhat outwardly so that the twine may pass to the inward end of the notch 39 and be yieldably held therein by the biasing action of the spring 42'. The wide mouthed notches 40 and 41 are for the purpose of receiving other strands of twine at different stages during the tying operation but they form no part of the present invention.

In operation the spring means 42 and 42' serve to yieldably hold the twine, such as that shown at 49, during the rendering of twine through the holding notches 38 and 39. It is thus apparent that twines of varying diameter can be utilized with the twine holding device 26 of this invention without materially effecting the successful tying of the twine. Further, the leaf type springs 42 and 42' are of such nature that they may yieldably exert a spring force in two directions, namely, arcuately and axially of the holding shaft 27 of the spaced plates 32 and 33. Thus, when twine 49 is rendered or pulled through the notch 38 the spring 42 acts to spring compress the surface of the twine and also to exert a longitudinal pressure against the rendering of twine through the notch 38. This double action spring means thus acts to counteract variations in surface coefficients of friction in addition to accommodating various diameters of twine to enable the knotting mechanism to complete substantially perfect knots during each tying operation.

Numerous details of construction may be varied throughout a wide range without departing from the principles disclosed herein and I, therefore, do not propose limiting the patent granted hereon otherwise than as necessitated by the appended claims.

What is claimed is:

1. A twine holder through which twine is rendered comprising spaced apart discs, a keeper positioned between said spaced apart discs, circumferentially open slots in said spaced apart discs for carrying twine therein, said keeper adapted to maintain the twine within said slots, and leaf spring means arranged and constructed to exert an arcuate force as well as an axial force adapted to cooperate with said slots for yieldably varying the effective width of said slots by said arcuate force and simultaneously retarding longitudinal movement of the twine by said axial force.

2. A device as set forth in claim 1 in which the spring means includes a base portion fastened to at least one of said spaced apart discs, an elongated flat arm portion biased across one of said slots, and said flat arm having an outer end portion turned outwardly.

References Cited in the file of this patent

UNITED STATES PATENTS

| 221,627 | Storle | Nov. 11, 1879 |
| 515,113 | Coppage | Feb. 20, 1894 |
| 744,153 | Appleby | Nov. 17, 1903 |
| 1,529,914 | Prochazka | Mar. 17, 1925 |